United States Patent

Tsuboi

[11] 4,030,018
[45] June 14, 1977

[54] POWER CONVERTER SYSTEM
[75] Inventor: Takashi Tsuboi, Katsuta, Japan
[73] Assignee: Hitachi, Ltd., Japan
[22] Filed: Jan. 13, 1976
[21] Appl. No.: 648,675
[30] Foreign Application Priority Data
  Jan. 16, 1975  Japan .............................. 50-6362
[52] U.S. Cl. ......................... 321/27 R; 104/148 R; 318/227; 318/345 G; 318/416; 318/506
[51] Int. Cl.² ......................................... H02M 7/00
[58] Field of Search ........... 104/148, 149; 318/125, 318/227, 345 R, 345 F, 345 G, 416, 506; 321/27 R

[56] References Cited
UNITED STATES PATENTS 3,257,597   6/1966   Weiser .............................. 321/27 R

FOREIGN PATENTS OR APPLICATIONS 2,117,602   9/1972   Germany .......................... 321/27 R
2,344,753   3/1975   Germany .......................... 321/27 R
  830,603   3/1960   United Kingdom ............. 321/27 R Primary Examiner—William M. Shoop
Attorney, Agent, or Firm—Craig & Antonelli

[57] ABSTRACT

A power converter system for converting an AC voltage into a DC voltage, comprising a transformer means provided with a primary winding connected to an AC power source and a secondary winding divided into a plurality of sets of coils; and rectifier means including a plurality of rectifier circuits, each of said rectifier circuits including controlled rectifier elements and having AC and DC terminals, said AC terminals of each rectifier circuit being connected to the corresponding one of the sets of secondary coils, said DC terminals of said respective rectifier circuits being connected in series to produce a DC output voltage from said rectifier means, a predetermined one of said rectifier circuits being adapted to control its DC output voltage sequentially and cyclically in a plurality of steps of generating the DC output voltage from said rectifier means, the remaining rectifier circuits being adapted to control their DC output voltages in an on-off fashion in said steps, said steps being switched over by on-off controlling said remaining rectifier circuits for on-off control when the DC voltage of said predetermined one of said rectifier circuits reaches an ultimate value in each cycle; the improvement wherein a voltage control range of the predetermined one of the rectifier circuits for sequential control is selected to overlap voltage control ranges of the remaining rectifier circuits for on-off control.

5 Claims, 9 Drawing Figures

POWER CONVERTER SYSTEM

BACKGROUND OF THE INVENTION

This invention relates to a power converter system which comprises a plurality of rectifier circuits each incorporated with controlled rectifiers.

The power converter system of this type is suitable for use especially in AC electric rolling-stock, and an explanation will be given herein with respect to AC electric rolling-stock, by way of an example.

In an AC electric rolling-stock of one type, AC power is converted into DC power to drive a DC motor, by means of a power converter system utilizing controlled rectifiers such as thyristors which facilitate a noncontact control of the main circuit.

In this case, the power converter system is usually constituted with a rectifier circuit including either a bridge connection of thyristors or that of thyristors and diodes in combination. With this arrangement, the phase control for thyristors will cause harmonic components on the AC input current to the power converter system. The harmonic component is transmitted through a power line for the electric rolling-stock, thereby causing inductive interference in communication lines and the like around the power line.

In order to reduce such harmonic components, in place of a power converter system incorporated with a single rectifier circuit, a conventionally proposed power converter system is provided with a plurality of rectifier circuits (for example three to four) having DC terminals connected in series with each other.

In the proposal, a design is taken such that a specified rectifier circuit sequentially and cyclically controls its DC output voltage and remaining rectifier circuits control their DC output voltages in an on-off fashion.

However, in the case where the power converter system is constituted with a plurality of rectifier circuits, there occurs a problem that the DC output current (flowing through a DC motor) is caused to overshoot since when the specified rectifier circuit for sequentially controlling the output voltage reaches the ultimate value, the output voltage is commutated to the rectifier circuits for on-off control. The reason for this will be given as follows. Generally speaking, a power converter system is connected to a power line through a transformer. Accordingly, the transformer is provided with a secondary winding which is divided into a plurality of sets of coils each connected to AC terminals of respective rectifier circuits of the power converter system. On the other hand, in order to eliminate the overshot current caused when the output voltage is commutated, it is necessary to make equal completely the voltage regulation of the AC input voltage applied to respective rectifier circuits before and after the voltage commutation. Namely, the percentage commutating reactances of respective coils of the transformer secondary winding are needed to be made equal completely, where the percentage commutating reactance is defined by the following formula:

$$\% \text{ commutating reactance} = \frac{\text{Commutating reactance} \times \text{rating current}}{\text{No load voltage across secondary coil}}$$

Practically, however, the production of an ideal transformer in which the percentage commutating reactances of the secondary coils are made equal completely is impossible since the percentage commutating reactance inevitably suffers from error due to errors in production of the number of coils and magnetic coupling between the coils and the core of the transformer. As a result, the percentage commutating reactances of the secondary coils become irregular. Thus, if the percentage commutating reactance of the secondary coil of the rectifier circuit for sequential control exceeds that of the rectifier circuit for on-off control, the overshot current will result.

The overshot current thus caused is responsible for such adverse affect as:

1. Creation of a surge current flowing through a DC motor which damages the motor;
2. Thermal destruction of thyristors, diodes and the like elements constituting the power converter system;
3. Increase in harmonic components on AC input current to the power converter system, causing the problem of inductive interferences;
4. Rapid increase in driving torque of the DC motor, accompanied by slip of wheels of the electric rolling-stock; and
5. Disturbance of a comfortable ride.

SUMMARY OF THE INVENTION

An object of this invention is to provide a power converter system capable of preventing the overshot current caused when a voltage commutation occurs between a rectifier circuit for controlling its DC output voltage sequentially and cyclically and a rectifier circuit for controlling its DC output voltage in an on-off fashion, and assuring a steady and smooth voltage control.

According to the invention, there is provided a power converter system comprising a converter including a transformer with a primary winding connected to an AC power source and a secondary winding divided into a plurality of sets of coils, and a plurality of rectifier circuits of controlled rectifiers having AC terminals respectively connected to the individual sets of secondary coils and DC terminals connected in series with each other, wherein a specified one of the rectifier circuits controls its DC output voltage sequentially and cyclically, and remaining rectifier circuits control their DC output voltages in an on-off fashion, the improvement wherein a voltage control range of the specified rectifier circuit for sequential control is selected to overlap voltage control ranges of the remaining rectifier circuits for on-off control.

DESCRIPTION OF THE PREFERRED EMBODIMENTS

Figure 1:
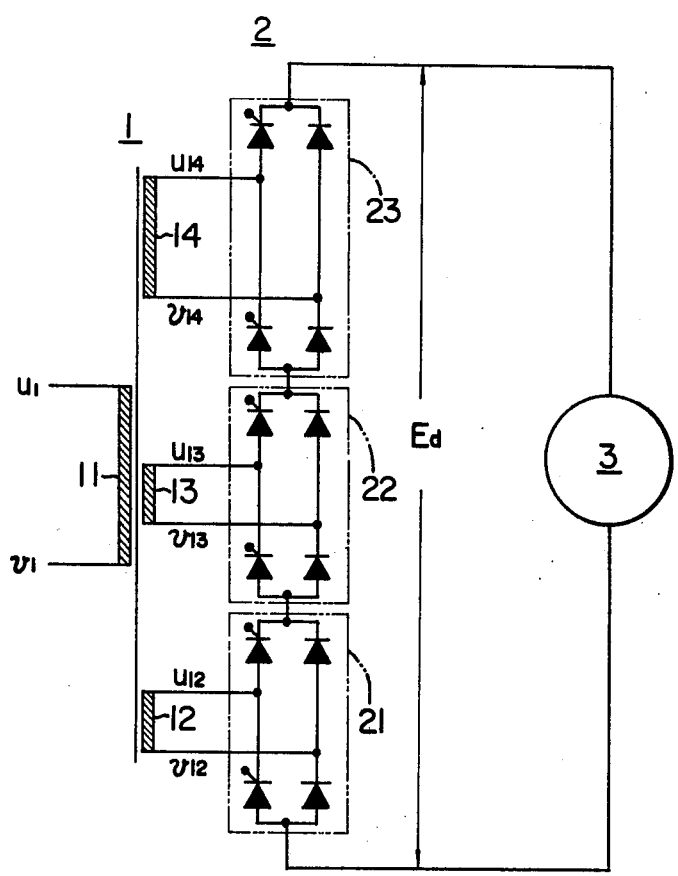
FIG. 1 is a schematic circuit diagram of a main circuit of a power converter system to which the invention is applicable.
Figure 2:
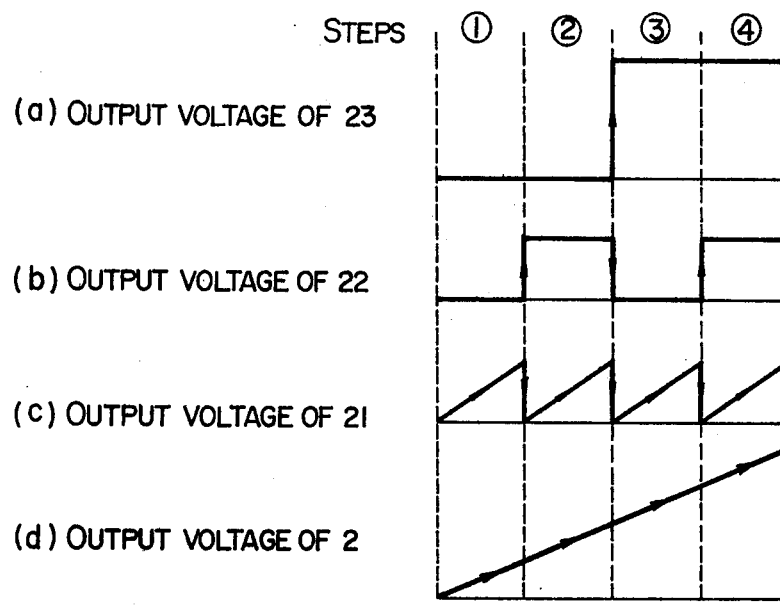
FIG. 2 is a waveform diagram useful to explain the operation of the power converter system shown in FIG. 1.

Referring to FIGS. 1 and 2, description will be made with respect to the construction and operation of a power converter system with a plurality of rectifier circuits, to which the invention is applicable.

As shown in FIG. 1, a primary winding 11 of a transformer 1 is connected to an AC power source (not shown) through terminals $u_1$ and $v_1$. The transformer 1 is provided with a secondary winding which is divided into three sets of coils 12, 13 and 14 and the winding ratio (i.e. voltage ratio) between these coils is 1 : 1 : 2. A power converter system generally designated at 2 comprises three rectifier circuits 21, 22 and 23. Individual rectifier circuits 21, 22 and 23 include a bridge connection of thyristors and diodes as shown in FIG. 1, and AC terminals of the bridge connection are connected to the secondary coil 12 through terminals $u_{12}$ and $v_{12}$, to the coil 13 through terminals $u_{13}$ and $v_{13}$ and to the coil 14 through terminals $u_{14}$ and $v_{14}$, respectively. DC outputs of the respective rectifier circuits 21, 22, 23, on the other hand, are connected in series and a DC motor 3 as a load is connected across the rectifier circuits 21 and 23. Thyristors incorporated in individual rectifier circuits are subject to controllable ignition by means of a phase-control device (not shown).

Obviously, the rectifier circuit may be constituted with thyristors alone. Further, the secondary winding of the transformer 1 which has been divided into three coils 12, 13 and 14 with unequal voltage ratio of 1 : 1 : 2 may be divided into four coils with equal voltage ratio of 1 : 1 : 1 : 1 within the range of obvious modification.

In operation, the rectifier circuit 21 controls its DC output voltage sequentially and cyclically as shown in FIG. 2c whereas the rectifier circuits 22 and 23 on-off control their DC output voltages as shown in FIGS. 2b and 2a.

When the rectifier circuit 21 for sequential control and rectifier circuits 22 and 23 for on-off control are operated, a summation Ed of DC output voltages from the converter 2, i.e. a DC voltage applied to the DC motor 3, varies sequentially through the steps①②③ and ④ of generation of DC output voltages at the converter 2, as shown in FIG. 2(d).

At step①:

Both the rectifier circuit 22 and 23 are rendered off and only the rectifier circuit 21 performs the sequential control. Accordingly, the DC output voltage Ed of the converter 2 is equal to the DC output voltage of the rectifier circuit 21.

At step②:

The rectifier circuit 22 is rendered on, the rectifier circuit 23 remains off, and the rectifier circuit 21 performs the sequential control. Accordingly, the DC output voltage Ed of the converter 2 becomes equal to a summation of the DC output voltages of the rectifier circuits 21 and 22.

At step③:

The rectifier circuit 22 is turned off, the rectifier circuit 23 remains on, and the rectifier circuit 21 performs the sequential control. Accordingly, the DC output voltage Ed of the converter 2 becomes equal to a summation of DC output voltages of the rectifier circuits 21 and 23.

At step④:

Both the rectifier circuits 22 and 23 are on and the rectifier circuit 21 performs the sequential control so that the DC output voltage Ed of the converter 2 becomes a summation of DC output voltages of the rectifier circuits 21, 22 and 23.

In this manner, the rectifier circuit 21 sequentially controls its DC output voltage until an ultimate output voltage is reached and then the step of generating DC output voltages is switched over along with repetitive sequential control of the rectifier circuit 21, thereby enabling the converter 2 to deliver the DC output voltage Ed which is sequentially controlled.

Figure 3:
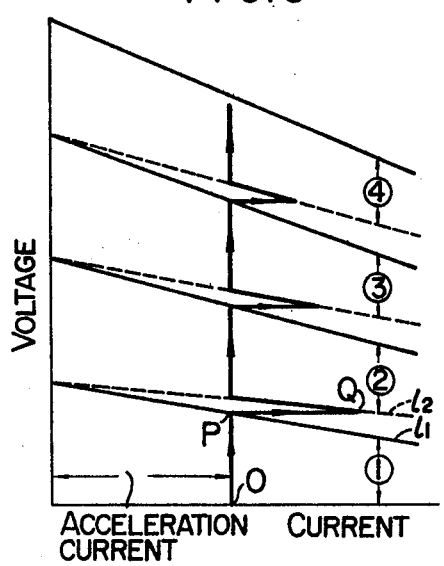
FIG. 3 is a current-voltage characteristic diagram of the power converter system shown in FIG. 1.

Turning now to FIG. 3, an overshot current upon switching over the step will be described which will occur in the case where the secondary coil of the rectifier circuit 21 for sequential control has, on account of production error, a larger percentage commutating reactance than the percentage commutating reactances of secondary coils of the remaining rectifier circuits 22 and 23 for on-off control.

During step①, as shown in FIG. 3, the DC output voltage is sequentially controlled from the point O to the point P on a straight line $l_1$ under a predetermined acceleration current by sequentially controlling the rectifier circuit 21. Immediately after the output voltage of the rectifier circuit 21 reaches a maximum value at the point P, it falls to zero, the rectifier circuit 22 is rendered on and the generation step is transferred to②, as shown in FIG. 2. However, since the secondary coil 13 of the rectifier circuit 22 has a smaller percentage commutating reactance than that of the secondary coil 12 of the rectifier circuit 21, the current-voltage characteristic immediately after the step①is transferred to step②will be illustrated at a straight line $l_2$. In consequence, the operating point abruptly rises from the point P to the point Q, causing the current to overshoot.

A similar overshot current may be caused at the time that the following generation steps are switched over, as shown in FIG. 3.

Accordingly, the invention has been carried out with a main object that the creation of the overshot current upon switching over the generation steps is prevented.

Figure 4:
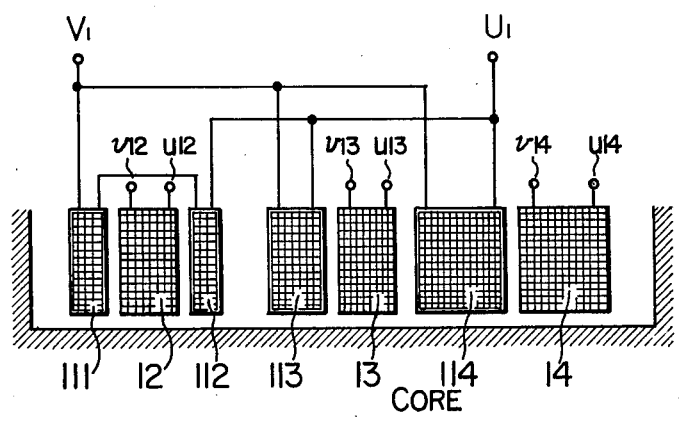
FIG. 4 is a diagramatic representation of a winding arrangement of a transformer embodying the invention.

Turning now to FIG. 4, according to the invention, a novel arrangement of the windings of the transformer 1 of FIG. 1 will be described. In FIG. 4, like members are designated by the same reference numerals as in FIG. 1. The primary winding 11 of the transformer 1 of FIG. 1 is divided into a plurality of sets of coils 111 to 114, as shown in FIG. 4. The transformer 1 is also provided, like FIG. 1, secondary coils 12, 13 and 14 respectively for rectifier circuits 21, 22 and 23. The primary coils 111 and 112 are connected in series and the secondary coil 12 is interposed therebetween. Therefore, a primary-secondary magnetic coupling between the primary coils 111 and 112 and the secondary coil 12 is more intimate in comparison with that between the primary coil 113 and the secondary coil 13 or that between the primary coil 114 and the secondary coil 14. It follows that even if the transformer 1 is irregular in its production error, the secondary coil 12 for the rectifier circuit 21 has a smaller percentage commutating reactance than those of the respective secondary coils 13 and 14 for the rectifier circuits 22 and 23.

Figure 5:
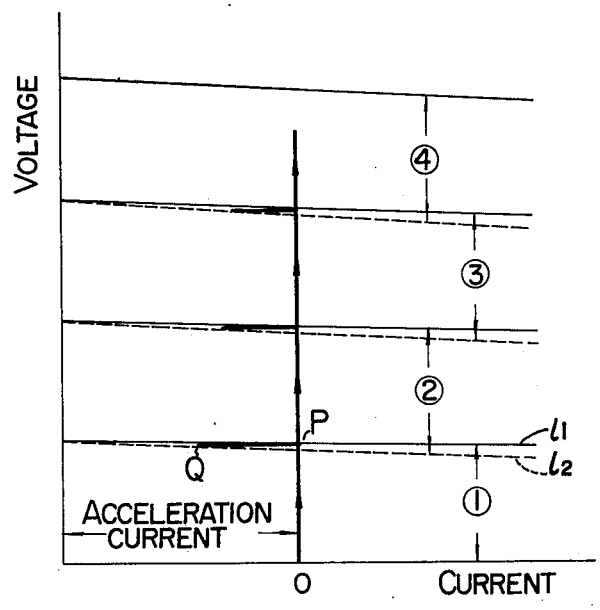
FIG. 5 is a current-voltage characteristic diagram of a power converter system with the transformer as shown in FIG. 4.

FIG. 5, which is similar to FIG. 3, shows a current-voltage characteristic obtainable from the power converter system of FIG. 1 in which the windings of the transformer 1 are so arranged as shown in FIG. 4. It will be seen from the figure that with the transformer having the windings of FIG. 4 a controllable voltage range of the rectifier circuit 21 for sequential control exceeds and thus overlaps voltage ranges of the rectifier circuits 22 and 23 for on-off control at steps ① to ④. As a result, when accelerating the DC motor 3 from the point O, the acceleration is performed within step ① to reach the point P and thereafter the output of rectifier circuit 21 falls to zero and the rectifier circuit 22 is rendered on to produce its output. At this time, the operating point P is once transferred to the point Q on the dotted line $I_2$. In other words, the current is once reduced. But, since the rectifier circuit 21 is phase-controlled by a current control device (not shown) the operating point recovers from the point Q to the point P at once.

In this manner, by providing the secondary coil 12 for the rectifier circuit 21 with a smaller percentage commutating reactance than those of the respective secondary coils 13 and 14 for the remaining rectifier circuits 22 and 23, the current is prevented from being overshot upon switching over the generation steps, thereby eliminating disadvantages of the prior art system. The reduction in the percentage commutating reactance to such an extent that the production error is compensated for at the greatest is satisfactory.

On the other hand, from the standpoint of view that harmonic components in the AC input current due to the phase control should be reduced, it is rather preferable to increase the percentage commutating reactance of the secondary coil 12 for the rectifier circuit 21. This is because the current variation rate $di/dt$ upon igniting thyristors, which is a main cause for the creation of harmonic components, can be minimized by maximizing the % commutating reactance.

Figure 6:
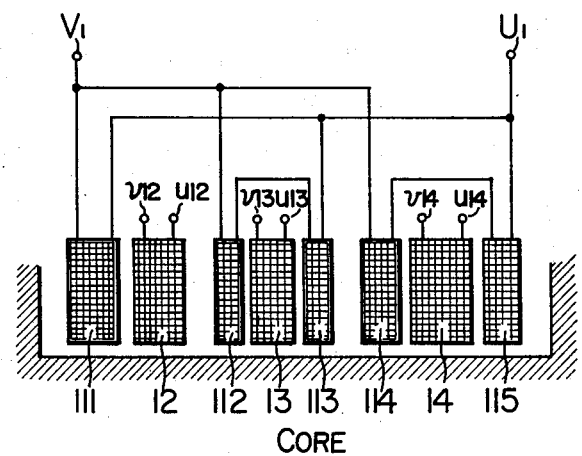
FIG. 6 is a diagramatic representation of a winding arrangement of a modified transformer of the invention.

In this connection, reference is made to FIG. 6 showing a modified arrangement of the transformer windings as another embodiment of the invention. In the figure, the primary winding 11 of the transformer 1 of FIG. 1 is divided into coils 111 to 115, and the secondary coils 12 to 14 are, like FIG. 1, loaded with the converter 2 and the DC motor 3. In this embodiment, the windings of the transformer 1 are arranged such that the secondary coil 12 owns a larger percentage commutating reactance than the commutating reactances of the remaining secondary coils 13 and 14. However, since a mere increase in the percentage commutating reactance prevents the overlap of the controllable voltage range at the respective output voltage generation steps, the secondary coil 12 is so designed as to be supplied with a higher voltage.

Figure 7:
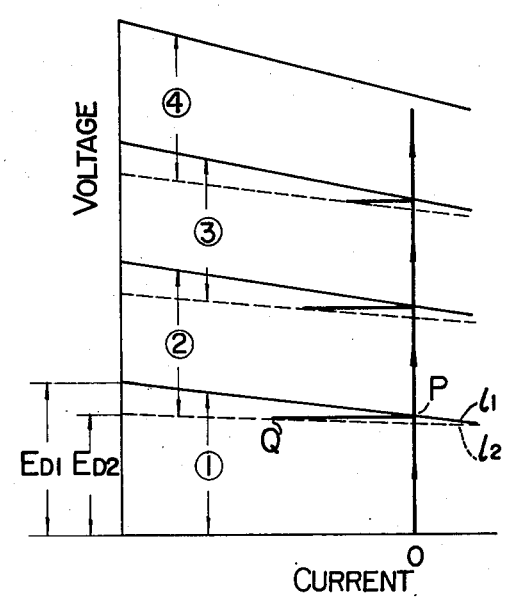
FIG. 7 is a current-voltage characteristic diagram of a power converter system with the transformer as shown in FIG. 6.

More particularly, it will be seen from FIG. 7 showing a current-voltage characteristic obtainable from the power converter system incorporated with the transformer having the windings of FIG. 6 that the overlap of the controllable voltage range can be assured at the respective steps by supplying the secondary coil 12 for sequential control with a voltage $E_{D1}$ which is larger than a voltage $E_{D2}$ applied to the secondary coil 13 for on-off control. Consequently, this embodiment also permits the acceleration of the DC motor 3 without causing the overshot current. Further, the secondary coil 12 for sequential control can have a large % commutating reactance to reduce the harmonic components due to the phase control of thyristors.

Figure 8:
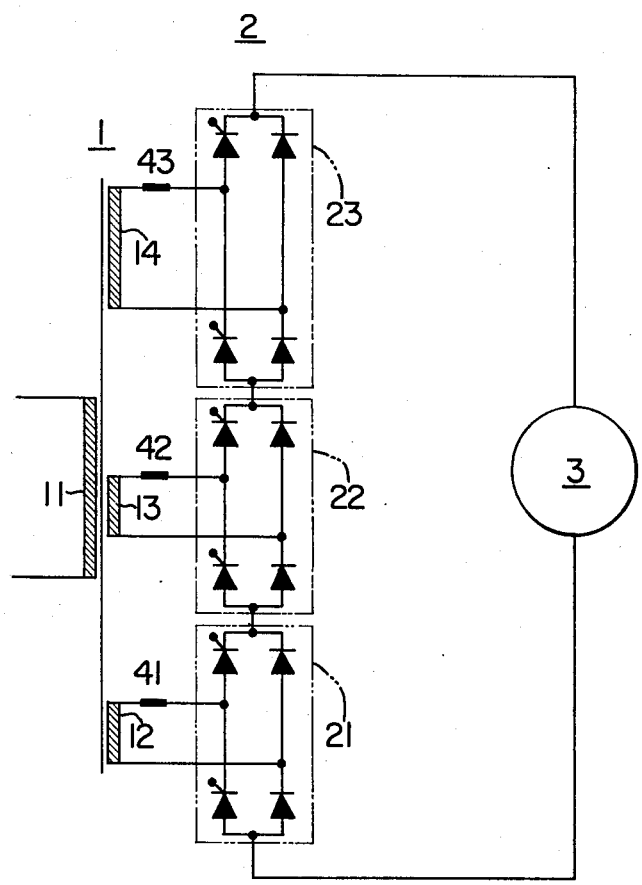
FIG. 8 is a schematic circuit diagram of another embodiment of the invention.

In the foregoing embodiments, as shown in FIGS. 4 and 6, an attempt has been made to prevent the overshot current upon switching over the voltage generation step by means of the winding arrangement of the transformer 1. Alternatively, to this end, reactors 41, 42 and 43 may respectively be inserted between the secondary coils 12, 13 and 14 and AC terminals of the rectifier circuits 21, 22 and 23, as shown in FIG. 8. In this case, the reactor 41 for the rectifier circuit 21 for sequential control is so designed as to have a smaller reactance than reactances of the respective reactors 42 and 43 for the rectifier circuits 22 and 23 for on-off control.

Figure 9:
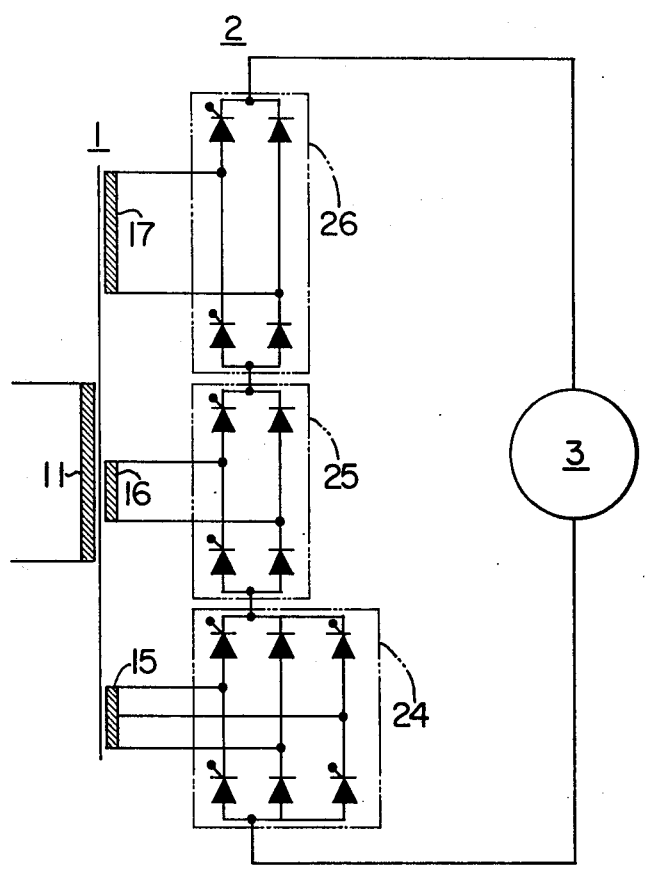
FIG. 9 is a schematic circuit diagram of a further embodiment of the invention.

Turning now to FIG. 9, a further embodiment of the invention will be described. In the figure, a transformer 1 is provided with secondary coils 15, 16 and 17 with a voltage ratio of 1 : 1 : 2, similarly to FIG. 1. But, the secondary coil 15 for a rectifier circuit 24 for sequential control is provided with an intermediate tap. The remaining rectifier circuits 25 and 26 for on-off control are constructed in the same manner as the rectifier circuits 22 and 23 of FIG. 1. The rectifier circuit 24 for sequential control, as shown in FIG. 9, comprises a bridge connection including two arms of thyristors and one arm of diodes. The AC input terminals of the thyristor arms are respectively connected to one end of the secondary coil 15 and the intermediate tap of the same, while the AC terminal of the diode arm is connected to the other end of the secondary coil 15.

In operation, the rectifier circuit 24 for sequential control first serves as a first mixed bridge rectifier circuit with the one thyristor arm connected to the intermediate tap of the secondary coil 15 and the diode arm to control its output voltage sequentially. When the output voltage reaches a maximum value, the rectifier circuit 24 serves as a second mixed bridge rectifier with the other thyristor arm connected to the one end of secondary coil 15 and the diode arm to control the entire voltage across the secondary coil 15 sequentially. Then, at the time that the output voltage of the second mixed bridge rectifier circuit reaches a maximum value, the rectifier circuit 25 is rendered on to produce its output voltage and the output voltage of the recfifier circuit 24 falls to zero. Then, a similar operation is repeated to control sequentially the voltage to be applied to the DC motor 3.

With the rectifier circuit for sequential control as shown in FIG. 9, the number of arms of the elements constituting the rectifier circuit is reduced by one as compared with two sets of rectifier circuits used, resulting in reduction of cost. The present invention may be of course applied to the power converter system of FIG. 9 in a similar manner to the embodiments as shown previously.

As has been described, the invention prevents the circuit from being overshot upon switching over the step of generating the DC output voltage and assures the smooth voltage control. Accordingly, the elements constituting the converter and the DC motor as a load are free from an excessive current due to the overshot current. Especially, where the invention is applied to AC electric rolling-stocks, in addition to the above advantages, wheel slip due to the abrupt variation in torque is prevented so that a comfortable ride can be secured.

I claim:

1. A power converter system for converting an AC voltage into a DC voltage, comprising a transformer means provided with a primary winding connected to an AC power source and a secondary winding divided into a plurality of sets of coils; and rectifier means including a plurality of rectifier circuits, each of said rectifier circuits including controlled rectifier elements and having AC and DC terminals, said AC terminals of each rectifier circuit being connected to the corresponding one of the sets of secondary coils, said DC terminals of said respective rectifier circuits being connected in series to produce a DC output voltage from said rectifier means, predetermined one of said rectifier circuits being adapted to control its DC output voltage sequentially and cyclically in a plurality of steps of generating the DC output voltage from said rectifier means, the remaining rectifier circuits being adapted to control their DC output voltages in an on-off fashion in said steps, said steps being switched over by on-off controlling said remaining rectifier circuits for on-off control when the DC output voltage of said predetermined one of said rectifier circuits reaches an ultimate value in each cycle; the improvement wherein the value of the DC output voltage from said rectifier means when the DC output voltage of said predetermined one of said rectifier circuits reaches said ultimate value is selected to be higher than the value of the DC output voltage from said rectifier means when the next step commences.

2. A power converter system according to claim 1, wherein the secondary coil of said transformer for said predetermined rectifier circuit has more intimate magnetic coupling than magnetic couplings of the secondary coils of said transformer for the remaining rectifier circuits thereby to effect said selection.

3. A power converter system according to claim 1, wherein the secondary coil of said transformer for said predetermined one of said rectifier circuits has less intimate magnetic coupling than magnetic couplings of the secondary coils for the remaining rectifier circuits and said predetermined one of said rectifier circuits has a larger voltage range than said remaining rectifier circuits, thereby to effect said selection.

4. A power converter system according to claim 1, wherein reactors are inserted between said secondary coils of said transformer and said rectifier circuits and one of the reactors for said predetermined one of said rectifier circuits has a smaller reactance than reactances of the remaining reactors for said remaining rectifier circuits, thereby to effect said selection.

5. A power converter system according to claim 1, wherein each of said rectifier circuits comprises a bridge connection of thyristors or thyristors and diodes in combination and the DC output voltage of said rectifier means is applied to a DC motor.

* * * * *